United States Patent [19]

Fletcher et al.

[11] 4,103,489

[45] Aug. 1, 1978

[54] TOTAL POWER FLUID SYSTEM

[75] Inventors: Edward Horton Fletcher, Waterloo; Gordon K. Wiegardt, Cedar Falls, both of Iowa

[73] Assignee: Deere & Company, Moline, Ill.

[21] Appl. No.: 787,789

[22] Filed: Apr. 15, 1977

[51] Int. Cl.² .............................. F16H 39/46
[52] U.S. Cl. ........................ 60/395; 60/448; 60/449; 60/451; 60/452; 60/DIG. 2
[58] Field of Search ................ 60/395, 431, 445, 448, 60/449, 451, 452, 465, 487, 490, DIG. 2; 180/6.3

[56] References Cited

U.S. PATENT DOCUMENTS

| 2,161,439 | 6/1939 | Thoma | 60/451 |
|---|---|---|---|
| 3,054,263 | 9/1962 | Budzich et al. | 60/449 X |
| 3,126,707 | 3/1964 | Hann et al. | 60/452 |
| 3,529,422 | 9/1970 | Herndon | 60/395 |
| 3,693,349 | 9/1972 | Morris | 60/448 |
| 3,901,031 | 8/1975 | Knapp et al. | 60/395 |
| 3,914,938 | 10/1975 | Cornell et al. | 60/395 |
| 3,927,528 | 12/1975 | Vander Kolk et al. | 60/431 |

Primary Examiner—Edgar W. Geoghegan

[57] ABSTRACT

A total fluid power system for an engine powered vehicle includes an engine driven, variable displacement pump, a pair of variable displacement wheel motors and auxiliary functions. Transducers sense engine speed, pump output pressure and motor speeds to supply signals to pump and motor controls which process the signals with operator input signals to maintain pump and motor displacements for optimum engine power usage and desired vehicle performance.

34 Claims, 2 Drawing Figures

TOTAL POWER FLUID SYSTEM

BACKGROUND OF THE INVENTION

The present invention relates generally to hydraulic systems and more particularly to a regulated pressure hydraulic system using variable displacement motors and pump, with a closed loop control system.

In the past, where many power outlets were desired from a single engine in a vehicle, the practice was to include a number of mechanical transmissions in addition to a number of hydraulic pumps to supply power to remote hydraulic motors. This was true even though there were only one engine and only 100% of its horsepower could ever be transmitted at any one time.

Further, extremely complicated control systems were required when many functions with varying requirements were included in the system or when the speed of a motor had to be regulated or where maximum performance from limited power was required.

SUMMARY OF THE INVENTION

The present invention provides a regulated pressure hydraulic system utilizing a closed loop variable displacement pump and a plurality of closed loop variable displacement motors in which the displacement of the pump is varied so as to maintain a regulated pressure to the motors which are responsive to a control signal, inlet pressure, loads and engine power. The pump output flow is controlled to regulate system pressure and the displacement of the motors are controlled to regulate the output torques and speed of the motors.

The above and additional advantages of the present invention will become apparent to those skilled in the art from a reading of the following detailed description taken in conjunction with the accompanying drawing.

DESCRIPTION OF THE PREFERRED EMBODIMENT

Figure 1:
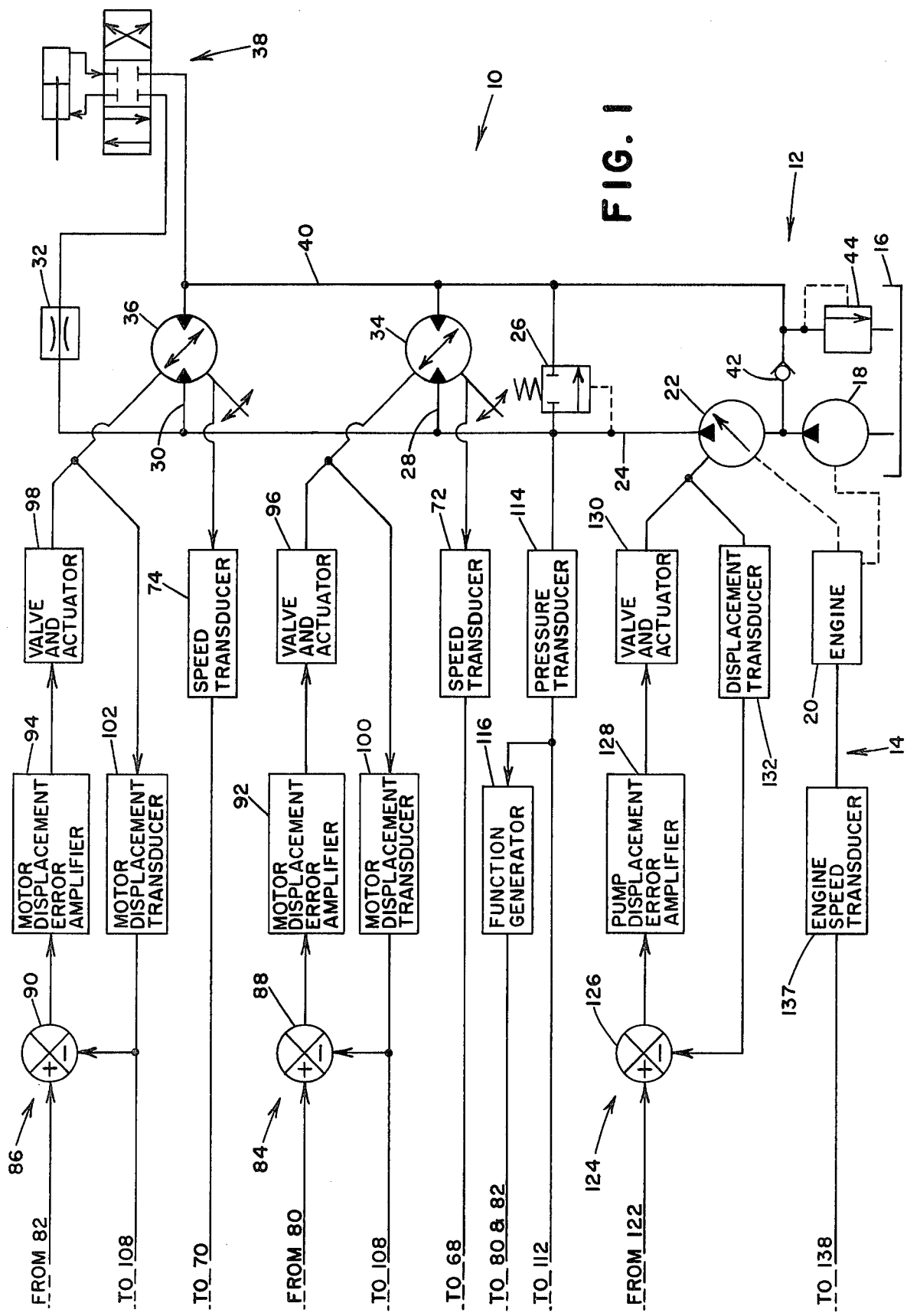
FIG. 1 is a schematic illustration of a portion of the total fluid power system in which the present invention is embodied.
Figure 2:
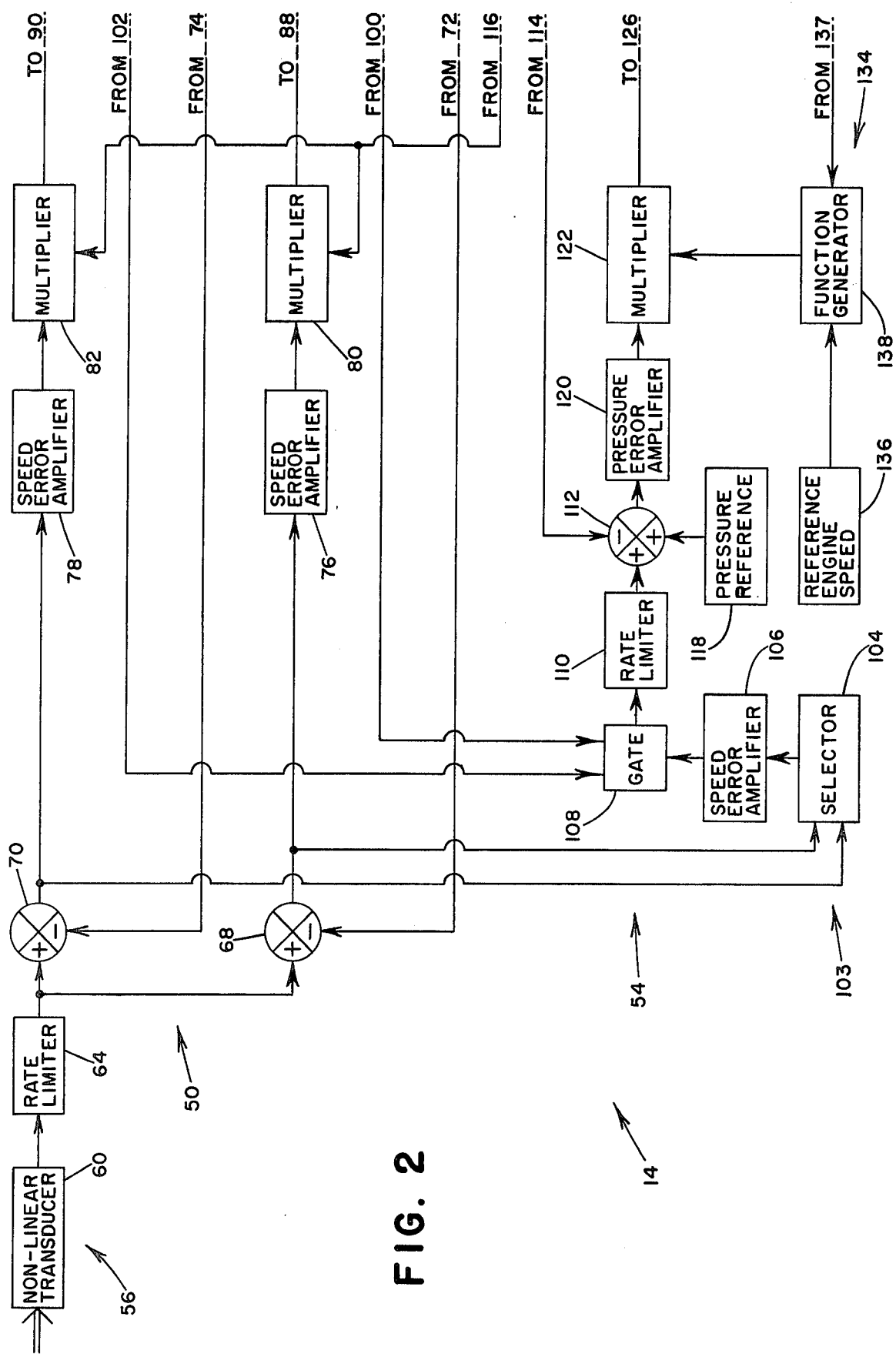
FIG. 2 is a schematic illustration of the remainder of the total fluid power system.

Referring now to the drawings, therein is shown a total fluid power system 10 which is generally incorporated in a hydrostatic drive vehicle (not shown). The total fluid power system 10 of the preferred embodiment includes a hydraulic system generally designated by the numeral 12 and an electrical control system generally designated by the numeral 14.

The hydraulic system 12 includes a fluid reservoir 16 which supplies fluid to a conventional charge pump 18 which is driven by the vehicle's prime power source, an engine 20. The engine 20 further drives a variable displacement main pump 22, the inlet of which is connected to the outlet of the charge pump 18. The outlet of the main pump 22 is connected to an outlet line 24 which in turn is connected to a relief valve 26, first and second inlet lines 28 and 30, and a flow control valve 32. The inlet lines 28 and 30 are connected respectively to first and second motors 34 and 36. The motors 34 and 36 are variable displacement, variable speed fluid motors which have output shafts drivingly connected to the drive wheels (not shown).

The first and second motors 34 and 36 can vary displacement from plus 100% to minus 100% and can go through zero displacement and reverse direction without reversing the direction of fluid flow therethrough. Th flow control valve 32 is connected to a conventional intermittent operation fluid function generally designated by the numeral 38. The relief valve 26, the first and second motors 34 and 36, and the function 38 are connected to a reservoir line 40 which is connected through a check valve 42 between the charge pump 18 and the main pump 22, and to a reservoir 16 through a pressure regulating valve 44.

Referring now to the electrical control system 14, therein is shown a motor control 50 and a main pump control 54. The motor control 50 includes an operator input control 56 containing a non-linear transducer 60 and rate limiter circuitry 64. The rate limiter circuitry 64 is connected to first inputs of speed error summing junctions 68 and 70. The second inputs of the speed error summing junctions 68 and 70 are connected respectively to motor speed transducers 72 and 74 which sense the speed and direction of rotation of the output shafts of the first and second motors 34 and 36. The outputs of the speed error summing junctions 68 and 70 are connected to speed error amplifiers 76 and 78, respectively, and thence to conventional multipliers 80 and 82. The multipliers 80 and 82 are connected, respectively, to first and second motor displacement controls 84 and 86.

The first and second motor displacement controls 84 and 86 are closed loop controls containing speed error displacement summing junctions 88 and 90 whose first inputs are connected to the multipliers 80 and 82, respectively, and whose outputs are connected respectively to motor displacement error amplifiers 92 and 94. The amplifiers 92 and 94 drive conventional valve and actuator systems 96 and 98 which, respectively, operate to change the displacement of the first and second motors 34 and 36, respectively. The motor displacement controls 84 and 86 further include motor displacement transducers 100 and 102, respectively, which are positioned to sense the actual displacement of the first and second motors 34 and 36, respectively. The displacement transducers 100 and 102 are further connected to the second inputs of the speed error-displacement summing junctions 88 and 90 to provide the feedback signal for closed loop control.

Referring now to the main pump controls 54, therein is shown a high torque control 103 which includes selector circuitry 104 which is connected to the outputs of the speed error summing junctions 68 and 70 and which passes on the larger of the two inputs. The output of the selector circuitry 104 is connected to a speed error amplifier 106 and thence to the first input of a gate 108. The second and third inputs of the gate 108 are connected respectively to the displacement transducers 100 and 102 in the first and second motor displacement controls 84 and 86. The output of the gate 108 is connected to rate limiter circuitry 110.

The rate limiter circuitry 110 is connected to the first input of pressure error summing junction 112. The second input of the summing junction 112 is connected to a conventional pressure transducer 114. The pressure transducer 114 is fluidly connected to the outlet line 24 and electrically connected through a function generator 116 to the multipliers 80 and 82 in the first and second motor controls 50 and 52, respectively. The third input of the summing junction 112 is connected to pressure reference circuitry 118. The output of the summing junction 112 is connected to the input of a pressure error amplifier 120 and thence to a multiplier 122. The multiplier 122 is connected in turn to a pump displacement control generally designated by the numeral 124.

The pump displacement control 124 includes a pressure error-displacement summing junction 126, the first input of which is connected to the multiplier 122 and the output of which is connected to a pump displacement error amplifier 128. The pump displacement error amplifier 128 is thence connected to a conventional valve and actuator system 130 for changing the displacement of the variable displacement main pump 22. A pump displacement transducer 132 is connected to the pump 22 to sense its displacement and provide displacement feedback to the second input of the pump displacement error summing junction 126.

The electrical control system 14 further includes an engine feedback system generally designated by the numeral 134 which includes reference engine speed circuitry 136 which is connected to the first input of a function generator 138. A second input of the function generator 138 is connected to an engine speed transducer 137. The output of the function generator 138 is connected to the multiplier 122.

In operation, the speed is changed by the operator providing manual speed command inputs to the operator input control 56. The input to the non-linear transducer 60 provides a forward signal therefrom which follows a predetermined curve shaped to give better resolution at low speeds, i.e. for the same amount of adjustment, there is less of a speed change at lower speeds. The non-linear transducer 60 output signal then goes to the rate limiter 64 where the rate of change of the signal is limited to prevent undesirable acceleration or decelerations of the vehicle, irregardless of how fast the operator input control 56 is moved, but which does not provide an undesirable lag. The resulting forward input signal is then summed in the speed error summing junction 68 with a feedback signal proportional to the actual motor speed from the speed transducer 72.

Where the operator input was intended to speed up the first motor 34, a speed error signal will be produced at the speed error summing junction 68 and will be amplified by the speed error amplifier 76, processed by the multiplier 80 as will later be described, and inputted into the speed error-displacement summing junction 88. The summing junction 88, when summing the speed error signal from the multiplier 80 and the unchanged displacement signal from the displacement transducer 100, will provide an increase displacement signal which will be amplified by the displacement error amplifier 92 and supplied to the valve and actuator 96 so as to increase the displacement of the first motor 34. As the displacement of the first motor 34 increases, the displacement transducer 100 will feed back the displacement signal thus causing the motor displacement to be proportional to the amplified speed error signal.

It is well known that the torque of a variable displacement motor is proportional to its displacement and input pressure. However, the first effect of the increased displacement is to reduce the pressure in the outlet line 24. The pressure reduction is sensed by the pressure transducer 114 which produces and feeds back a pressure signal proportional to the reduction in pressure to the pressure error summing junction 112 where it will be compared with a pressure reference signal from the pressure reference circuitry 118 which provides a predetermined standby operating pressure in the outlet line 24. A pressure error signal indicating the lack of sufficient operating pressure will be sent from the pressure error summing junction 112 to the pressure error amplifier 120 and thence to the multiplier 122. Provided that the difference between the actual engine speed and the engine speed reference signal is within limits, as will be later described, the pressure error signal will be further inputted to the pressure error-displacement summing junction 126 where it will be summed with the unchanged displacement signal from the displacement transducer 132 to produce an increase displacement signal. The increase displacement signal will be sent to the pump displacement error amplifier 128 and thence to the valve and actuator system 130 to cause the displacement of the main pump 122 to increase so as to increase the pressure and fluid flow in the outlet line 24 until the increase displacement signal is eliminated by the feedback signal from the displacement transducer 132. The resulting increased torque of the first motor 34 causes the speed of the motor to increase. The speed of the first motor 34 is fed back from the speed transducer 72 in the form of an increasing signal to the speed error summing junction 68 to reduce the speed error signal and establish the new pump and motor displacements for the new speed.

Conversely, the first motor 34 is slowed by having the operator input control 56 cause the first motor displacement control 84 to decrease the displacement of the first motor 34. A decrease in the displacement of the first motor 34 will cause the speed of the motor to decrease. This in turn will cause an increase in pressure which will be fed back to the pump displacement control 124 to cause the main pump 22 to decrease its displacement and output flow, to maintain the system pressure desired.

In operation, when the first and second motors 34 and 36 are operating at a constant speed, the imposition of a load requiring increased torque from either or both of the motors 34 and 36 will cause a change in the speed of the motors.

For example, when the load is imposed on the first motor 34, the motor 34 will be slowed and the pressure in the inlet line 28 and thus the outlet line 24 will be increased. As the pressure increases in the outlet line 24, the pressure transducer 114 increases the signal to the pressure error summing junction 112 causing the pump displacement control 124 to decrease the displacement of and fluid flow from the pump 22. With the pump fluid flow decreased, the speed of the first motor 34 decreases further which causes a decrease in the feedback signal from the speed transducer 72 to the speed error summing junction 68. The speed error summing junction 68 will then cause the first motor displacement control 84 to increase the displacement of the first motor 34 which results in a pressure decrease thereat. This pressure decrease is then fed back from the pressure transducer 114 to the pressure error summing amplifier 112 which causes the pump displacement control 124 to increase the displacement of the pump 22 and thus speed up the first motor 34 to its previous speed with increased torque output.

Conversely when the loads drops off, the first motor 34 will increase in speed and the pressure in the outlet line 24 will decrease. As the pressure in the outlet line 24 decreases, the pressure transducer 114 decreases the pressure signal to the pressure error summing junction 112 causing the pump displacement control 124 to increase the displacement of the pump 22. With the pump displacement and output flow increased, the speed of the first motor 34 increases further and increases the signal from the speed transducer 72 to the speed error summing junction 68. The speed error summing amplifier 68 will then cause the first motor displacement control 84 to decrease the displacement of the first motor 34 which results in a pressure increase thereat. This pressure increase is fed back to cause the displacement of the pump 22 to decrease and thus slow the first motor 34.

As would be evident to those skilled in the art, although the load may be imposed only on one, the other motor will change displacement in accordance with the pressure fluctuations in the outlet line 24 so as to maintain an actual speed equal to the operator input speed. Further, as is evident, the motor inlet pressure and displacement, which determine motor torque, are always balanced to match the load and the pump displacement, which determines pump output pressure and flow, is varied to maintain the desired motor speed. Any number of power outlets, such as additional motors, can be introduced without affecting the others so long as the total power requirement does not exceed the total engine horsepower.

Under normal operating conditions, the standby pressure as established by the pressure reference circuitry 118 is pre-set to a selected value, however, when extreme loads are imposed on the motors 34 and 36, a high torque mode of operation is available. As the limit of normal operation is approached, the displacement of one or the other or both of the motors 34 and 36 will increase to a predetermined maximum (approximately 95% of maximum motor displacement) which activates the gate 108 so as to allow the selector 104 to provide the larger of the two speed error signals through the gate 108 to the rate limiter circuitry 110. The rate limiter circuitry 110 provides a signal having a predetermined rate of increase to the pressure error summing junction 112 which provides a signal to pressure error amplifier 120 and thence to the pump displacement control 124 to cause the displacement of the main pump 22 to increase and force the pressure in the outlet line 24 to higher levels than that established by the pressure reference signal from the pressure reference circuitry 118 with the upper level being established by the maximum output of the engine 20. With the pressure in the outlet line 24 increased, the displacements of the first and second motors 34 and 36 will be unchanged or will decrease to provide the torque required to maintain vehicle speed.

Similarly, when the high torque mode is no longer required, the selected operating standby pressure will be re-established. When the pressure in the outlet line 24 drops below a predetermined minimum, it is often desired that the functions other than the motors 34 and 36, such as the power steering fluid function 38, have priority use of the remaining pressure. In this situation, the pressure transducer 114 through the function generator 116 will provide a pressure signal according to a predetermined curve which is in part linear which will cause the multipliers 80 and 82 in the motor control 50 to nonlinearly reduce the speed error signals until the speed error signal is completely blocked at a predetermined low pressure in the outlet line 24. If the signals from the speed error summing junction 68 and 70 are reduced to zero, the first and second motor displacement controls 84 and 86 will reduce the displacements and thus the flow requirements of the first and second motors 34 and 36 to zero. This pressure priority operation is reversible as the pressure in the outlet line 24 again increases.

When the total power requirement of the hydraulic system 12 begins to approach the total engine horsepower, the engine 20 will begin to lug down in speed and there will be an increased difference between the actual engine speed and the reference engine speed. This difference is processed in the engine feedback system 134 by the function generator 138. The signal from the function generator 138 will follow a predetermined curve which is in part linear so as to selectively modify the pressure error signal in the multiplier 122 to gradually cause a reduction in the pressure error signal as the error between the actual and reference engine speeds increases. As a signal from the multiplier 122 decreases, the pump control 124 will cause the displacement of the pump 22 to decrease so as to reduce the burden on the engine 20 and allow the engine 20 to run at optimum speed.

While the invention has been described in conjunction with a specific embodiment, it is to be understood that many alternatives, modifications, and variations will be apparent to those skilled in the art in light of the aforegoing description. For example, the motors could be used to drive auxilliary functions other than the drive wheels of the vehicle. Accordingly, it is intended to embrace all such alternatives, modifications, and variations which fall within the spirit and scope of the appended claims.

We claim:

1. A total fluid power system comprising: a variable displacement fluid pump means having an outlet providing a flow of pressurized fluid proportional to pump means displacement; a variable displacement, variable speed fluid motor means having an inlet connected to the pump means outlet and providing a torque output proportional to motor means inlet fluid pressure and motor means displacement; pump control means connected to between the pump means outlet and the motor means inlet and operatively associated with the pump means for changing the displacement thereof in response to changes in the pressure of the pressurized fluid between the pump means outlet and the motor means inlet; and motor control means operatively associated with the motor means for changing the displacement thereof in response to changes in the speed of the motor means due to motor means loading whereby the pump means output flow is changed by changing the pump means displacement so as to maintain the motor means speed and the motor means torque output is changed by changing the motor means displacement so as to match the motor means loading.

2. The total fluid power system as claimed in claim 1 wherein the motor control means includes motor speed sensor means operatively associated with the motor means for providing an indication of actual motor means speed and operator input means for providing an indication of desired motor means speed, said motor control means further including means operatively associated with the motor speed sensor means and the operator input means for changing the displacement of the motor means in response to a difference between the actual and desired motor means speed indications.

3. The total fluid power system as claimed in claim 2 wherein the operator input means includes means for regulating the desired motor means speed indication according to a predetermined curve.

4. The total fluid power system as claimed in claim 2 wherein the operator input means includes means for limiting the rate of change of the desired motor means speed indication to a predetermined rate.

5. The total fluid power system as claimed in claim 1 wherein the pump control means includes pressure sensor means connected to the motor means inlet for providing an indication of the pressure of pressurized fluid thereat and the motor control means includes priority means operatively associated with the pressure sensor means for changing the displacement of the motor means in response to a predetermined pressure indication at the motor means inlet.

6. The total fluid power system as claimed in claim 5 wherein the motor control means includes means for regulating the changing of the displacement of the motor means according to a predetermined curve.

7. The total fluid power system as claimed in claim 6 wherein the motor control means includes motor displacement sensor means operatively associated with the motor means for providing an indication of motor means displacement and the pump control means includes high torque means operatively associated with the motor displacement sensor means for changing the displacement of the pump means in response to a predetermined indication of the motor means displacement.

8. The total fluid power system as claimed in claim 7 wherein the pump control means includes means for limiting the rate of change in the displacement of the pump means due to a failure to maintain the motor means speed.

9. The total fluid power system as claimed in claim 1 including: an engine drivingly connected to the pump means; engine speed sensor means operatively associated with the engine and providing an indication of the actual engine speed; engine input means providing an indication of optimum engine speed; engine control means operatively associated with the engine speed sensor means and the operator engine input means and providing an error indication indicative of the difference between the actual and optimum engine speeds; and wherein the pump control means includes means operatively associated with the engine control means for changing the displacement of the pump means in response to a predetermined error indication.

10. A total fluid power system comprising: a fluid reservoir; a variable displacement fluid pump having an inlet operatively connected to the reservoir and an outlet providing a flow of pressurized fluid; a variable displacement, variable speed fluid motor having an inlet connected to the pump outlet and providing a torque output; pressure sensor means connected to the pump outlet responsive to the pressure of pressurized fluid thereat to provide a pressure signal proportional thereto; reference pressure means providing a reference pressure signal proportional to a predetermined pump outlet pressure; pump displacement means operatively associated with the pump and connected to the pressure sensor means and pressure reference means to increase and decrease pump displacement in response respectively to a pressure signal smaller and larger than the pressure of reference signal; motor speed sensor means connected to the motor responsive to the speed thereof to provide a speed signal proportional thereto; input speed means providing an input speed signal; and motor displacement means operatively associated with the motor and connected to the motor speed sensor means and the input speed means to increase and decrease motor displacement in response to speed error signals respectively representative of a speed signal smaller and larger than the input speed signal whereby the pump output flow is changed by changing the pump displacement so as to maintain the motor speed and the motor torque output is changed by changing the motor displacement so as to match the motor loading 11. The total fluid power system as claimed in claim 10 wherein the pump displacement means includes: displacement sensor means responsive to the pump displacement to provide a displacement signal proportional thereto; pressure error means for processing the pressure signal and the reference pressure signal to provide a pressure error signal proportional to the difference therebetween; displacement error means connected to the displacement sensor means and the pressure error means for processing the displacement signal and the pressure error signal to provide an actuation signal proportional to the difference therebetween; and actuator means connected to the displacement error means for changing the pump displacement in response to the actuation signal.

12. The total fluid power system as claimed in claim 10 wherein the motor displacement means includes: displacement sensor means responsive to the motor displacement to provide a displacement signal proportional thereto; displacement error means connected to the displacement sensor means for processing the displacement signal and the speed error signal to provide an actuation signal proportional to the difference therebetween; and actuator means connected to the displacement error means for changing the motor displacement in response to the actuation signal.

13. The total fluid power system as claimed in claim 10 wherein the input speed means includes operator input means for increasing and decreasing the input speed signal.

14. The total fluid power system as claimed in claim 13 wherein the operator input means includes means for causing a smaller change in the input signal at lower motor speeds than at higher motor speeds for a predetermined change in operator input.

15. The total fluid power system as claimed in claim 13 wherein the operator input means includes means for limiting the rate of change in the input speed signal to a predetermined rate.

16. The total fluid power system as claimed in claim 10 wherein the pressure sensor means includes function means responsive to the pressure of pressurized fluid at the pump outlet to provide a modified pressure signal having a predetermined nonlinear proportionality to the pressure, and the input speed means includes means connected to the function means responsive to the modified pressure signal to reduce the speed error signal in proportion thereto.

17. The total fluid power system as claimed in claim 10 wherein the motor displacement means includes motor displacement sensor means responsive to the motor displacement to provide a displacement signal proportional thereto, and the pump displacement means includes means connected to the motor displacement sensor means responsive to a predetermined motor displacement signal indicative of a predetermined percentage of the maximum motor displacement and to a speed signal smaller than the input speed signal to increase the pump displacement.

18. The total fluid power system as claimed in claim 17 wherein the means responsive to a predetermined displacement signal includes means for limiting the increase of the pump displacement to a predetermined rate in response to the predetermined displacement signal.

19. The total fluid power system as claimed in claim 10 including: an engine drivingly connected to the pump; engine speed sensor means operatively associated with the engine and providing an indication proportional to the actual engine speed; engine input means providing an indication proportional to the optimum engine speed; engine control means operatively associated with the engine speed sensor means and the engine input means for providing an error indication indicative of the difference between the actual and optimum engine speeds; and wherein the pump displacement means includes means connected to the engine control means for decreasing the displacement of the pump in response to a predetermined error indication.

20. A total fluid power system comprising: a fluid reservoir; a variable displacement fluid pump having an inlet operatively connected to the reservoir and an outlet for providing a flow of pressurized fluid in proportion to the displacement; a variable displacement fluid motor having an inlet connected to the pump outlet and a rotatable output shaft providing an output torque proportional to the displacement; a pressure transducer positioned at the pump outlet providing actual pressure signals proportional to the actual pressure thereat; reference pressure means providing a predetermined reference pressure signal proportional to a predetermined operating stand-by pump outlet pressure; pressure error summing means connected to the pressure transducer and the reference pressure means for summing the actual and reference pressure signals and providing increase and decrease pressure error signals in response respectively to pressure signals smaller and larger than the reference pressure signal; a pump displacement transducer operatively connected to the pump providing displacement signals proportional to the displacement of the pump; pressure error-displacement summing means operatively connected to the pressure error summing means and the pump displacement transducer for summing the pressure error and pump displacement signals and providing increase and decrease pump actuation signals in response respectively to pressure error signals smaller and larger than the pump displacement signals; pump actuator means operatively associated with the pump and the pressure error-displacement summing means for increasing and decreasing the pump displacement in response respectively to the increase and decrease pump actuation signals; a shaft speed transducer operatively connected to the motor output shaft and providing speed signals proportional to the rotative speed of the shaft; input speed means providing an input speed signal; speed error summing means connected to the speed transducer and to the input speed means for summing the speed and input speed signals and providing increase and decrease speed error signals in response respectively to speed signals smaller and larger than the speed input signal; a motor displacement transducer operatively connected to the motor providing displacement signals proportional to the displacement of the motor; speed error-displacement summing means operatively connected to the speed error summing means and the motor displacement transducer for summing the speed error and motor displacement signals and providing increase and decrease motor actuation signals in response respectively to speed error signals smaller and larger than the motor displacement signals; and motor actuator means operatively associated with the motor and the speed error-displacement summing means for increasing and decreasing the motor displacement in response respectively to the increase and decrease motor actuation signals.

21. The total fluid power system as claimed in claim 20 wherein the input speed means includes operator input means for increasing and decreasing the input speed signal.

22. The total fluid power system as claimed in claim 21 wherein the operator input means includes a non-linear transducer providing a smaller change in the input speed signal at lower motor speeds than at higher motor speeds for a predetermined change in the operator input.

23. The total fluid power system as claimed in claim 21 wherein the operator input means includes rate limiter means for limiting the rate of change of the input speed signal to a predetermined rate.

24. The total fluid power system as claimed in claim 20 including function generator means connected to the pressure transducer responsive to the pressure signals to provide a modified pressure signal having a non-linear proportionality to the pressure signal and terminating at a predetermined pressure signal, and including means disposed between the speed error means and the speed error-displacement summing means responsive to the modified pressure signal to partly linearly decrease the speed error signal and terminate the speed error signal at a predetermined modified pressure signal.

25. The total fluid power system as claimed in claim 20 including high pressure means operatively connected to the speed error summing means, the motor displacement transducer, and the pressure error summing means responsive to the speed error signal in a predetermined motor displacement signal to provide a high torque signal to the pressure error summing means so as to increase the pressure error signal.

26. The total fluid power system as claimed in claim 25 including rate limiter means interposed between the high pressure means and the pressure error comparator means to limit the increase of the high torque signal to a predetermined rate.

27. The total fluid power system as claimed in claim 20 including: an engine drivingly connected to the pump, and engine speed transducer operatively associated with the engine providing an engine speed signal proportional to the actual engine speed; reference engine speed means providing a reference engine speed signal proportional to optimum engine speed; function generator means connected to the engine speed transducer and the reference engine speed means responsive to a first predetermined difference between the engine speed and reference engine speed signals to provide a first engine error signal and to a second predetermined difference to provide a second engine error signal; means connected to the function generator means and disposed in the connection between the pressure error summing means and the pressure error-displacement summing means responsive to an engine error signal between the first and second engine error signals to decrease the pressure error signal according to a predetermined partly linear curve and responsive to the second engine error signal to block the pressure error signal from the pressure error-displacement summing means.

28. A total fluid power system comprising: a fluid reservoir; a variable displacement fluid pump having an inlet operatively connected to the reservoir and an outlet for providing pressurized fluid; a variable displacement fluid motor having an inlet connected to the pump outlet and an output shaft rotatable by the pressurized fluid; pump control means interposed between the pump outlet and the motor inlet operatively associated with the pump for changing the displacement thereof in response to changes in the pressure of the pressurized fluid between the pump outlet and the motor inlet; motor speed sensor means operatively associated with the motor output shaft for providing an indication of actual speed and direction of rotation of the motor output shaft; operator input means for providing an indication of the desired speed and direction of rotation of the motor output shaft; motor displacement means operatively associated with the motor, the motor speed sensor means, and the operator input means for changing the displacement of the motor in response to differences between the indications of the actual and desired speed and direction of rotation of the output shaft.

29. A total fluid power system comprising: a variable displacement fluid pump having an inlet operatively connected to a fluid reservoir and an outlet for providing pressurized fluid; a first variable displacement fluid motor having an inlet connected to the pump outlet and a first output shaft rotatable by the pressurized fluid; a second variable displacement fluid motor having an inlet connected to the pump outlet and a second output shaft rotatable by the pressurized fluid; pump control means connected to the pump outlet and operatively associated with the pump for changing the displacement thereof in response to the changes in the pressure of the pressurized fluid at the pump outlet; first motor speed sensor means operatively associated with the first output shaft for providing an indication of actual speed and direction of rotation of the first motor output shaft; operator input means for providing indication of desired speed and direction of rotation of the first and second motor output shafts; motor displacement means operatively associated with the first motor, the first motor speed sensor means, and the operator input means for changing the displacement of the first motor in response to differences between the indications of actual and desired speed and direction of rotation of the first output shaft, said motor displacement means operatively associated with the second motor, the second motor speed sensor means, and the operator input means for changing the displacement of the second motor in response to differences between the indications of the actual and desired speed and direction of rotation of the second output shaft.

30. A total fluid power system comprising: a fluid reservoir; a variable displacement fluid pump having an inlet operatively connected to the reservoir and an outlet providing pressurized fluid; a variable displacement, variable speed fluid motor having an inlet connected to the pump outlet and an output shaft rotatable by the pressurized fluid; pump control means operatively associated with the pump and the motor responsive to changes in the pressure of the pressurized fluid at the pump outlet and to a predetermined displacement of the motor to change the displacement of the pump; motor control means operatively associated with the motor and the pump control means responsive to changes in the speed of the motor shaft and to a predetermined pressure of pressurized fluid at the pump outlet to change the motor displacement.

31. A total fluid power system comprising: a fluid reservoir; a variable displacement fluid pump having an inlet operatively connected to the reservoir and an outlet providing pressurized fluid; a variable displacement, variable speed fluid motor having an inlet connected to the pump outlet; an engine drivingly connected to the pump; pump control means operatively associated with the pump and the engine responsive to changes in the pressurized fluid between the pump outlet and the motor inlet and to a predetemined change in the engine speed to change the pump displacement; and motor control means operatively associated with the motor and the pump control means responsive to changes in the speed of the motor and a predetermined pressure of pressurized fluid between the pump outlet and the motor inlet to change the displacement of the motor.

32. In an engine powered vehicle, a total fluid power system comprising: a fluid reservoir; a variable displacement, engine driven fluid pump having an inlet operatively connected to the reservoir and an outlet for providing pressurized fluid; first and second variable displacement, variable speed, fluid wheel motors having inlets connected to the pump outlet and first and second wheel shafts rotatable by the pressurized fluid, pump control means operatively associated with the pump, the engine, and the first and second wheel motors responsive to changes in the pressure of pressurized fluid at the pump outlet, to a predetermined change in the engine speed, and to a predetermined displacement of either the first and second wheel motor and the larger of the changes in the speed of the first and second wheel motors to change the displacement of the pump; and first and second wheel motor control means operatively associated, respectively, with the first and second wheel motors and the pump control means responsive, respectively, to changes in the speed of the first and second wheel shafts and to a predetermined pressure of the pressurized fluid at the pump outlet to respectively change the first and second wheel motor displacements.

33. In an engine powered vehicle, a total fluid power system comprising: a fluid reservoir; a variable displacement, engine driven fluid pump having an inlet operatively connected to the reservoir and an outlet for providing pressurized fluid; first and second variable displacement; variable speed, fluid wheel motors having inlets connected to the pump outlet and having first and second wheel shafts, respectively, rotatable by the pressurized fluid to drive first and second vehicle drive wheels; a pressure transducer positioned at the pump outlet providing a pressure signal proportional to the pressure thereat; reference pressure means providing a predetermined reference pressure signal proportional to a predetermined stand-by pump outlet pressure; pressure error summing means connected to the pressure transducer and the reference pressure means for summing the pressure and reference pressure signals and providing pressure error signals in response to a pressure signal smaller and larger than the reference pressure signal; a pump displacement transducer operatively connected to the pump providing a displacement signal proportional to the displacement of the pump; pressure error-displacement summing means operatively connected to the pressure error summing means and the pump displacement transducer for summing the pressure error and pump displacement signals and providing pump actuation signals in response to a pressure error signal smaller and larger than the pump displacement signal; pump actuator means operatively associated with the pump and the pressure error-displacement summing means for increasing and decreasing the pump displacement in response to pump actuation signals; first and second wheel speed transducers operatively connected to the first and second wheel motors, respectively, and providing wheel speed signals proportional to the respective rotative speed of the first and second motor output shafts; first and second input speed means respectively providing first and second input speed signals; first speed error summing means connected to the first wheel speed transducer and to the first input speed means for summing the first actual and input speed signals and providing first speed error signals in response respectively to a first actual speed signal smaller and larger than the first speed input signal; second speed error summing means connected to the second wheel speed transducers and to the second input speed means for summing the second actual and input speed signals and providing second speed error signals in response respectively to a second actual speed signal smaller and larger than the second speed input signal; first and second motor displacement transducers operatively connected to the first and second motors providing first and second displacement signals proportional to the displacement of the first and second motors, respectively; first speed error-displacement summing means operatively connected to the first speed error summing means and the first motor displacement transducer for respectively summing the first speed error and motor displacement signals and providing first motor actuation signals in response respectively to a first speed error signal smaller and larger than the first motor displacement signal; and first motor actuator means operatively associated with the first motor and the first speed error-displacement summing means for increasing and decreasing the first motor displacement in response respectively to first positive and negative motor actuation signals; second speed error-displacement summing means operatively connected to the second speed error summing means and the second motor displacement transducer for respectively summing the second speed error and motor displacement signals and providing second motor actuation signals in response respectively to a second speed error signal smaller and larger than the first motor displacement signal; and second motor actuator means operatively associated with the second motor and the second speed error-displacement summing means for increasing and decreasing the second motor displacement in response respectively to second motor actuation signals.

34. The total fluid power system as claimed in claim 33 including engine feedback means operatively connected to the engine and interposed between the pressure error summing means and the pressure error-displacement summing means responsive to decreases in the engine speed to decrease or block the pressure error signal to the pump actuator means, first multiplier means operatively connected to the pressure transducer and interposed between the first speed error summing means and the first motor actuator means responsive to a predetermined range of fluid pressures to decrease or block the speed error signal to the first motor actuator means, second multiplier means operatively connected to the pressure transducer and interposed between the second speed error summing means and the second motor actuator means responsive to a predetermined range of fluid pressures to decrease or block the second speed error signals to the second motor actuator means, and gate means operatively associated with the first and second motor displacement transducers for selectively blocking and connecting the larger of the first and second speed error signals to the pressure error summing means in response to a displacement in the first or second motor below and above predetermined displacements.

* * * * *